Sept. 15, 1925.

H. WILLIAMS

AUTO BUMPER

Filed April 15, 1925    2 Sheets-Sheet 1

1,553,656

INVENTOR
HENRY WILLIAMS
By
ATTORNEY

Sept. 15, 1925.
H. WILLIAMS
AUTO BUMPER
Filed April 15, 1925   2 Sheets-Sheet 2
1,553,656
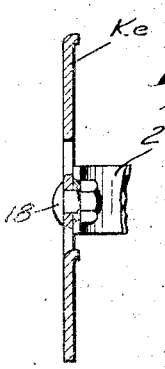
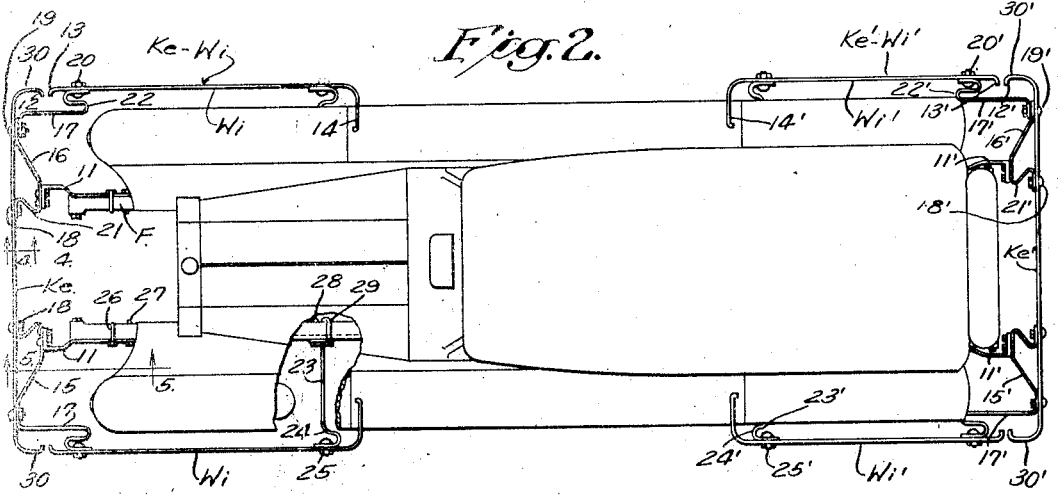
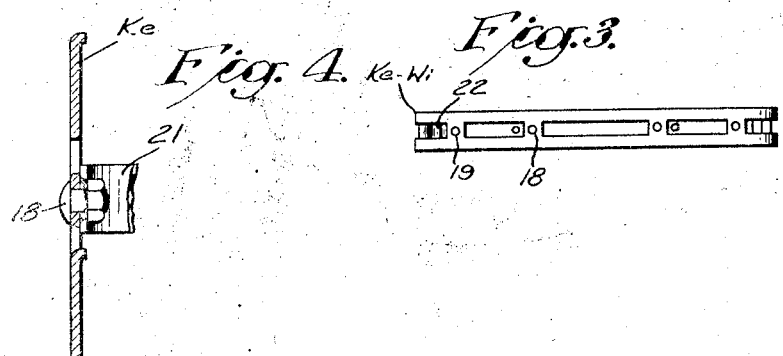
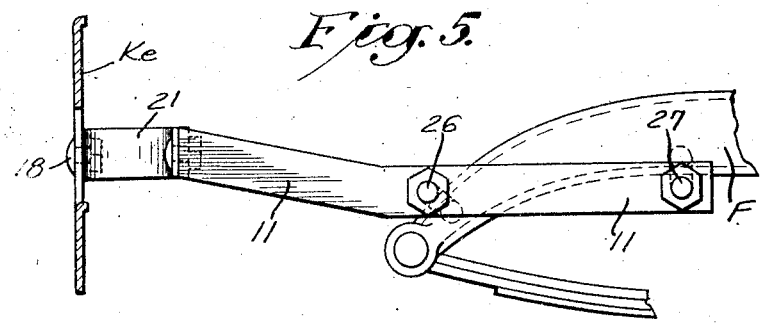
INVENTOR
HENRY WILLIAMS
BY
ATTORNEY Patented Sept. 15, 1925.

1,553,656

UNITED STATES PATENT OFFICE.

HENRY WILLIAMS, OF LOS ANGELES, CALIFORNIA.

AUTO BUMPER.

Application filed April 15, 1925. Serial No. 23,421.

*To all whom it may concern:*

Be it known that I, HENRY WILLIAMS, a citizen of the United States, residing at Los Angeles, in the county of Los Angeles, State of California, have invented a new and useful Auto Bumper, of which the following is a specification.

Although my present invention is referred to as an auto bumper, I may state at the outset that embodiments of my invention are suitable for use on either end of a car and are intended to provide protection for wheels and fenders, as well as for radiators and other parts which may be disposed more directly at the front or the rear of a car.

It is an object of this invention to provide what I may term a combined bumper and guard organization, all parts of the same being preferably secured by means comprising comparatively stiff but resilient and curved or bent horizontal intermediate elements which are adapted to yield slightly in case of a collision or impact; and the substantially vertical guard plates of my bumpers are preferably so disposed that the wheels of vehicles accidentally contacting or colliding at an angle are not likely to be crushed or to become interlocked.

It is a further object of my invention to provide end bumper elements and side bumper elements respectively supported from a main frame or chassis; and, in a preferred embodiment, these elements may be disposed in a common horizontal plane and interconnected in such manner as to afford mutual support, although without a consequent prevention of limited relative movement.

It is a further object of my invention to provide a bumper construction with means facilitating the attachment of bumper sets at the respective ends of a vehicle in such manner that the side elements thereof may be suitably spaced from wheels and from the fenders extending thereover, the preferred relationships being such as to permit the usual turning of the front wheels.

All of my bumpers or guards may optionally be provided with inwardly bent ends; and it is a further object of my invention to provide simple and effective means whereby longitudinally extending brackets such as have heretofore been used for the support of front or rear transverse bumper plates may participate in the support of lateral, longitudinally extending bumper elements; and the entire set of bumper elements, including, for example, a front bumper plate and a pair of wheel-guarding lateral bumper plates oppositely disposed and separate therefrom (or a similar set at the rear of the vehicle) may advantageously be secured to a vehicle frame by laterally extending resilient intermediate members comprising S-bends, these intermediate members being additional to the mentioned longitudinally extending brackets; and the means by which my bumpers are attached to a vehicle frame may advantageously comprise hook-bolts, or the like, permitting the entire organization, or parts thereof, to be attached or detached at will, without the necessity of cutting holes in the frame or body of a car from which my bumpers may be supported.

Other objects of my invention may be best understood from a detailed description of a typical embodiment thereof, taken in connection with the appended claims and the accompanying drawings, in which—

Fig. 2 is a diagrammatic top plan view of a car equipped with a front set and a rear set of bumpers illustrating my invention.

Fig. 3 is a front elevational view, the car being omitted.

Fig. 4 is an enlarged detail view, taken substantially as indicated by the line 4—4 of Fig. 2, but broken.

Fig. 5 is an additional detail view, taken substantially as indicated by the line 5—5 of Fig. 2.

Figure 1:
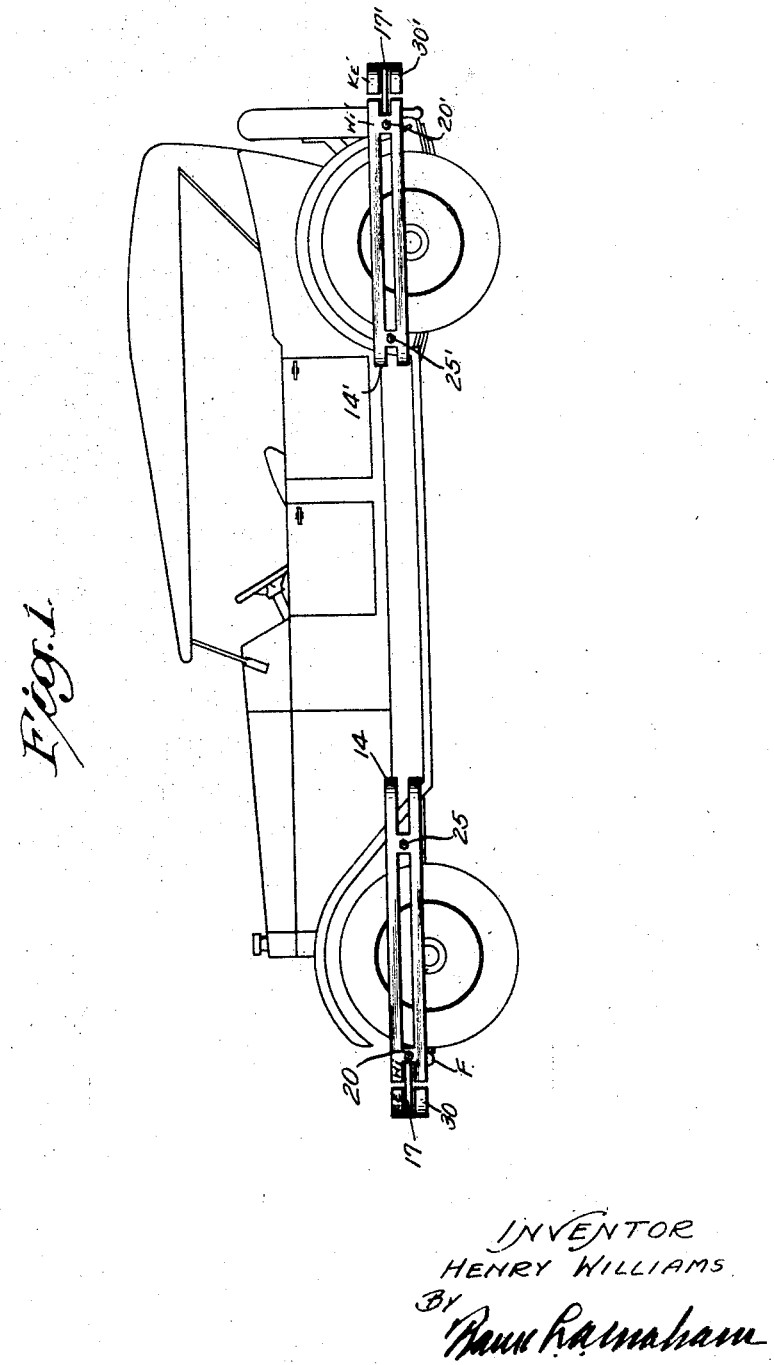
Fig. 1 is a side elevational view of an automobile equipped with bumpers secured near the front and the rear thereof, and illustrating my invention.

Referring to the details of that specific embodiment of my invention chosen for purposes of illustration, a forward set of bumpers may comprise a front bumper plate $Ke$ and a pair of side or guard bumper plates $Wi$, the latter being shown as substantially alike, except as they are respectively adapted to be placed on opposite sides of a machine; and the tail bumper set may comprise a rear bumper plate $Ke'$ and side or guard bumper plates $Wi'$, the respective front and rear bumper sets of a complete organization being generally designated by the characters $Ke$—$Wi$ and $Ke'$—$Wi'$. The front set $Ke$—$Wi$ and the rear set $Ke'$—$Wi'$ may be substantially alike as to their external form and dimensions, and optionally alike even as to their mode of attachment, except as, for example, forwardly extending brackets 11 for the support of the front set may be required to be spaced apart a less distance than the rearwardly extending brackets 11' of the rear set; and the side plates W$i$' of a rear set, when not individually extensible, may not need to be quite so long as the corresponding elements W$i$, of a front set,—this obviously depending upon the positions and the dimensions of exterior parts of a particular car.

Although I do not consider it best to provide any direct mechanical connections whatever between a rear bumper set and a front bumper set of the general character described, I do consider it advantageous to deflect inwardly the respective ends of some or all of the bumper plates, as at 12, 13 and 14, and at 12', 13' and 14'; and I consider it advantageous also to employ the respective brackets 11 and/or 11' not only in the support of transverse bumper plates, but also in the support of the adjacent ends of side bumper plates. For example, in case a front bumper plate and a left side bumper, or a complete set or sets of bumpers are to be permanently applied to a machine previously unequipped even with a front and/or rear bumper or bumpers, I may attach to the respective brackets 11 (and/or 11') intermediate supporting elements 15, (15') respectively provided with terminal S-bends extending into contact with and secured to the faces of the respective plates K$e$ and W$i$ (or K$e$' and W$i$'); but, when it is desired removably to secure a side plate W$i$ (or W$i$') or to attach side bumpers to cars previously provided with front (or rear) bumpers of the general character illustrated, assuming the same to be supported from brackets 11, (11') by means such as intermediate members 16 (or 16'), I may support the adjacent ends of side plates W$i$ (or W$i$') therefrom by means such as supplemental intermediate members 17 (or 17'). In either case, the intermediate members may be attached to the transverse bumper plates K$e$ (or K$e$') at two points, as by bolts 18 and 19 (or 18' and 19') and to a side bumper plate at one or more points 20 (or 20'), S-bends being provided as at 21 and 22 (or 21' and 22'); and the opposite or inner ends of the side plates W$i$ (or W$i$') may be supported by means such as horizontal arms 23, (23'), shown as also provided at their outer ends with S-bends 24 (or 24') in the vicinity of studs or bolts 25, (25'). The inner ends of the brackets 11, (11') and the inner ends of the horizontal arms 23 (or 23') may be secured to the main frame F or chassis of a vehicle in any suitable way, as by means of hook bolts 26, 27, 28 and 29,—the obvious advantage in the employment of this simple mode of attachment being the facility with which a bumper or set of bumpers may be applied without the necessity of cutting any holes through a vehicle frame or body, or elsewhere.

It will be obvious that, whenever intermediate members of the type illustrated at 15 (or 15') are employed, a transverse bumper and a side bumper or bumpers can be simultaneously attached or detached, whereas the described construction comprising intermediate members 16 and 17 (or 16' and 17') admits of the separate attachment and detachment of a side bumper or bumpers at will.

The rebent ends 30 (or 30') of my transverse bumpers K$e$ (or K$e$') are intended normally to rest in the same vertical planes as the plate or plates W$i$ (or W$i$') of the side bumper or bumpers respectively disposed at right angles thereto; and, instead of providing each end of a car with a three-bumper set, I may employ, near either end of a car, or at both ends, either one, two or three bumpers. I may provide a car with a "permanent" bumper set at one end, as at the front thereof, and with a readily removable bumper set oppositely disposed at the rear; or, as shown in Fig. 2, I may provide a car with "permanent" transverse bumpers extending across the ends and down one side thereof, as the left side, and with removable bumpers on the right or "off" side; but, in any case, the respective side bumper plates are preferably to be so proportioned and positioned as each to extend around and protect both a wheel and a fender, although avoiding obstruction of a running board.

The described bumpers are sufficiently independent so that either may yield relatively to the adjacent bumper; but the interconnection between my bumpers is nevertheless intended to be such that each may contribute to the stability of the others; and the level at which my bumpers are attached as well as the inward bending of the ends 14 (or 14') thereof, is intended to be such as greatly to reduce or practically to eliminate danger of an interlocking of wheels, or damage to a fender, in an ordinary traffic jam, or the like.

Although my bumper plates might be secured to the supporting brackets or to intermediate elements or to one another by various alternative means, I have suggested in Fig. 4 the employment of short bolts having squared shoulders or bodies adapted to interfit tightly within a plurality of complemental openings of similar configuration, so as to prevent relative rotation between the associated parts. Slightly longer bolts, of this general type, may be advantageously used at 19 (and 19') especially in case separate supplemental intermediate members 17

(or 17') are not extended into engagement with brackets 11 (or 11'); and, in order to facilitate the changing of tires or wheels, whether or not outwardly extending stud bolts are provided at 20 and 25 (or 20' and 25') I may so dispose the nuts employed in securing the side plates W*i* (and W*i'*) that the same wrench used in the fastening or unfastening of rim lugs may also be used in the attachment or detachment of these plates.

Although I have herein described a single complete embodiment of my invention, suggesting various alternatives as to mode of attachment and as to the absolute number and relative positions of bumpers supported from a car frame, it should be understood that various features of my invention may be independently employed, and also that various modifications might be made by those skilled in the art to which this case relates, without involving the slightest departure from the spirit and scope of my invention, as the same is indicated above and in the following claims.

I claim as my invention:

1. A bumper organization comprising: a transverse bumper supported by means including brackets which extend lengthwise of a machine; a side bumper; and means whereby an end of said side bumper is also supported from one of the mentioned brackets, said supporting means comprising an intermediate member provided with S-bends and contacting with one of said bumpers at a plurality of points.

2. In an auto bumper organization: oppositely disposed sets of bumpers respectively comprising transverse bumper plates and longitudinally extending bumper plates all resiliently supported at substantially the same horizontal level from a car frame and by means comprising S-bends which permit limited relative movement, in a horizontal plane, between said bumpers.

3. In an organization of the character described: a transverse bumper plate and a side bumper plate, said plates being interconnected but separately movable and respectively provided with inwardly turned terminal portions.

4. In an organization of the character described: a front bumper and a side bumper secured to a car by means comprising laterally extending resilient intermediate members.

5. In an organization of the character described: a front bumper and a side bumper secured to a car by means comprising laterally extending resilient intermediate members supported by brackets extending from a car frame.

6. In an organization of the character described: a front bumper and a side bumper secured to a car by means comprising laterally extending resilient intermediate members respectively provided with S-bends.

7. In an organization of the character described: a lateral bumper resiliently supported at one end by a substantially horizontal arm comprising a resilient bar.

8. In an organization of the character described: a lateral bumper resiliently supported at one end by a substantially horizontal arm comprising a resilient bar and supported at its other end by means supporting also a front bumper.

9. In combination: an automobile provided with a frame and wheels; and separate bumpers supported from said frame and protecting said wheels respectively against interlocking with the wheels of another machine, each of said wheel-protecting bumpers being inwardly bent relatively to a fender but supported independently thereof.

10. In combination: an automobile provided with a frame and wheels and mud guards or fenders extending thereover; and separate bumpers supported from said wheels and extending over said wheels and mud guards or fenders, each of said wheel-protecting bumpers being inwardly bent relatively to a fender but supported independently thereof.

11. An automobile having an end protected by separately movable bumpers disposed substantially at right angles to one another in substantially the same horizontal plane and having the ends thereof inwardly rebent.

In testimony whereof, I have hereunto set my hand at Los Angeles, California, this 25th day of March, 1925.

HENRY WILLIAMS.